United States Patent
Taniguchi et al.

(10) Patent No.: US 11,834,379 B2
(45) Date of Patent: Dec. 5, 2023

(54) CERAMIC RAW MATERIAL POWDER, MULTILAYER CERAMIC CAPACITOR AND MANUFACTURING METHOD OF MULTILAYER CERAMIC CAPACITOR

(71) Applicant: TAIYO YUDEN CO., LTD., Tokyo (JP)

(72) Inventors: Katsuya Taniguchi, Takasaki (JP); Tsuyoshi Sogabe, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 60 days.

(21) Appl. No.: 17/578,249

(22) Filed: Jan. 18, 2022

(65) Prior Publication Data
US 2022/0135485 A1 May 5, 2022

Related U.S. Application Data

(63) Continuation of application No. 16/700,809, filed on Dec. 2, 2019, now Pat. No. 11,261,132.

(30) Foreign Application Priority Data

Dec. 12, 2018 (JP) .................................. 2018-232703

(51) Int. Cl.
*C04B 35/468* (2006.01)
*H01G 4/12* (2006.01)
(Continued)

(52) U.S. Cl.
CPC ......... *C04B 35/4682* (2013.01); *H01G 4/012* (2013.01); *H01G 4/1227* (2013.01);
(Continued)

(58) Field of Classification Search
CPC ........ C04B 35/4682; C04B 2235/3256; C04B 2235/3262; C04B 2235/768; H01G 4/1227
See application file for complete search history.

(56) References Cited

U.S. PATENT DOCUMENTS 6,437,969 B2    8/2002    Mizuno et al.
6,710,000 B2    3/2004    Kawamoto et al.
(Continued)

FOREIGN PATENT DOCUMENTS

| JP | 2011256091 A | * 12/2011 | ........... C04B 35/468 |
|---|---|---|---|
| JP | 2017108128 A | 6/2017 | |
| JP | 2017228737 A | 12/2017 | |

OTHER PUBLICATIONS

Non-Final Office Action issued by U.S. Patent and Trademark Office, dated May 12, 2021, for U.S. Appl. No. 16/700,809 (12 pages).
(Continued)

*Primary Examiner* — Noah S Wiese
(74) *Attorney, Agent, or Firm* — Law Office of Katsuhiro Arai

(57) ABSTRACT

Ceramic raw material powder includes: a main phase having a perovskite structure, wherein elements acting as a donor and an acceptor are solid-solved in B sites of the perovskite structure, wherein a first relationship of value A<value B is satisfied in a center region of each grain of the ceramic raw material powder; a second relationship of value A>value B is satisfied in a circumference region of each grain of the ceramic raw material powder, and value A in the second relationship gradually decreases from the circumference region to the center, wherein value A is a value of (concentration of the element acting as a donor)×(valence of the element acting as a donor−4), and value B is a value of
(Continued)

(concentration of the element acting as an acceptor)×(4−valence of the element acting as an acceptor).

7 Claims, 3 Drawing Sheets

(51) Int. Cl.
    *H01G 4/012*     (2006.01)
    *H01G 4/30*     (2006.01)

(52) U.S. Cl.
    CPC ....... *H01G 4/30* (2013.01); *C04B 2235/3256* (2013.01); *C04B 2235/3262* (2013.01)

(56) References Cited

U.S. PATENT DOCUMENTS

| | | | |
|---|---|---|---|
| 6,721,167 B2 * | 4/2004 | Chazono | H01G 4/1209 361/321.5 |
| 2016/0217924 A1 * | 7/2016 | Morita | C04B 35/4682 |
| 2017/0152187 A1 | 6/2017 | Nagaoka et al. | |
| 2017/0287636 A1 | 10/2017 | Sakurai et al. | |
| 2017/0372841 A1 | 12/2017 | Kawamura et al. | |

OTHER PUBLICATIONS

Notice of Allowance issued by U.S. Patent and Trademark Office, dated Oct. 22, 2021, for U.S. Appl. No. 16/700,809 (9 pages).

\* cited by examiner

CERAMIC RAW MATERIAL POWDER, MULTILAYER CERAMIC CAPACITOR AND MANUFACTURING METHOD OF MULTILAYER CERAMIC CAPACITOR

CROSS-REFERENCE TO RELATED APPLICATION

This application is a continuation of U.S. patent application Ser. No. 16/700,809, filed Dec. 2, 2019, and claims the benefits thereof, which is based upon and claims the benefit of priority of the prior Japanese Patent Application No. 2018-232703, filed on Dec. 12, 2018, each disclosure of which is herein incorporated by reference in its entirety. The applicant herein explicitly rescinds and retracts any prior disclaimers or disavowals or any amendment/statement otherwise limiting claim scope made in any parent, child or related prosecution history with regard to any subject matter supported by the present application.

FIELD

A certain aspect of the present invention relates to ceramic raw material powder, a multilayer ceramic capacitor and a manufacturing method of a multilayer ceramic capacitor.

BACKGROUND

A multilayer ceramic capacitor has a structure in which each of dielectric layers and each of internal electrode layers are alternately stacked. The dielectric layers are formed by sintering ceramic raw material powder. It is therefore preferable that the ceramic raw material powder has predetermined characteristic, from a viewpoint of favorable performance of the multilayer ceramic capacitor. For example, there is disclosed a technology in which a predetermined element is solid-solved in the ceramic raw material powder in advance, in order to achieve sufficient reliability even if thicknesses of the dielectric layers are reduced (for example, see Japanese Patent Application Publication No. 2017-108128 hereinafter referred to as Document 1 and Japanese Patent Application Publication No. 2017-228737 hereinafter referred to as Document 2).

SUMMARY OF THE INVENTION

In Document 1, barium titanate in which a donor element is solid-solved is used. With the technology, although life of the multilayer ceramic capacitor is improved because of donor effect, degradation of insulation characteristic may be a problem. In Document 2, barium titanate in which a donor element and an acceptor element are solid-solved is used. However, with the technology, although the degradation of the insulation characteristic can be suppressed, the donor effect may be degraded.

The present invention has a purpose of providing ceramic raw material powder, a multilayer ceramic capacitor and a manufacturing method of a multilayer ceramic capacitor that are capable of achieving donor effect and acceptor effect.

According to an aspect of the present invention, there is provided ceramic raw material powder including: a main phase having a perovskite structure, wherein an element acting as a donor and an element acting as an acceptor are solid-solved in B sites of the perovskite structure, wherein a relationship of (concentration of the element acting as a donor)×(valence of the element acting as a donor−4)<(concentration of the element acting as an acceptor)×(4−valence of the element acting as an acceptor) is satisfied, in a center region of each grain of the ceramic raw material powder, wherein a relationship of (concentration of the element acting as a donor)×(valence of the element acting as a donor−4)>(concentration of the element acting as an acceptor)×(4−valence of the element acting as an acceptor) is satisfied, in a circumference region of each grain of the ceramic raw material powder.

According to another aspect of the present invention, there is provided a manufacturing method of a multilayer ceramic capacitor including: forming green sheets including ceramic raw material powder of which a main phase has a perovskite structure; forming a multilayer structure by alternately stacking each of the green sheets and each of paste for internal electrode; firing the multilayer structure, wherein an element acting as a donor and an element acting as an acceptor are solid-solved in B sites of the perovskite structure, wherein a relationship of (concentration of the element acting as a donor)×(valence of the element acting as a donor−4)<(concentration of the element acting as an acceptor)×(4−valence of the element acting as an acceptor) is satisfied, in a center region of each grain of the ceramic raw material powder, wherein a relationship of (concentration of the element acting as a donor)×(valence of the element acting as a donor−4)>(concentration of the element acting as an acceptor)×(4−valence of the element acting as an acceptor) is satisfied, in a circumference region of each grain of the ceramic raw material powder.

According to another aspect of the present invention, there is provided a multilayer ceramic capacitor including: a plurality of dielectric layers; and a plurality of internal electrode layers, wherein each of the plurality of dielectric layers and each of the plurality of internal electrode layers are alternately stacked, wherein the plurality of dielectric layers are formed by firing the above-mentioned ceramic raw material powder.

DETAILED DESCRIPTION

A description will be given of an embodiment with reference to the accompanying drawings.

Figure 1:
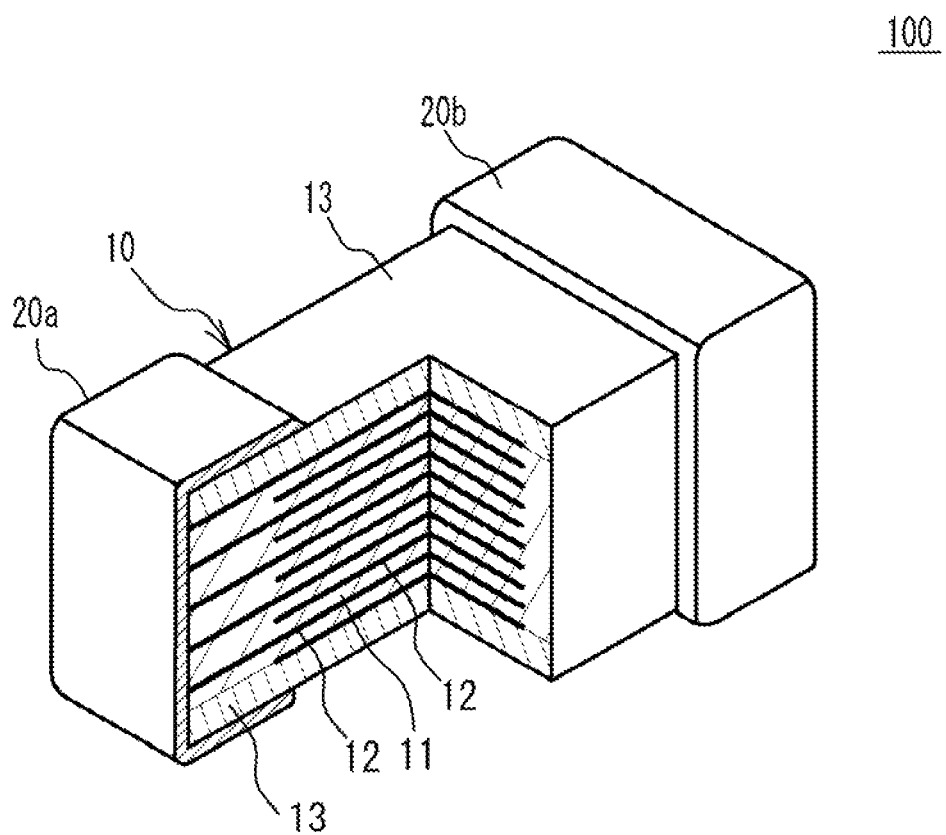
FIG. 1 illustrates a perspective view of a multilayer ceramic capacitor in which a cross section of a part of the multilayer ceramic capacitor is illustrated.

(Embodiment) FIG. 1 illustrates a perspective view of a multilayer ceramic capacitor 100 in accordance with an embodiment, in which a cross section of a part of the multilayer ceramic capacitor 100 is illustrated. As illustrated in FIG. 1, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face faces with the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, the internal electrode layer 12 is positioned at an outermost layer. The upper face and the lower face of the multilayer chip 10 that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof.

The dielectric layers 11 are mainly composed of a ceramic material that is expressed by a general formula $ABO_3$ and has a perovskite structure. The perovskite structure includes $ABO_{3-\alpha}$, having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. For example, the dielectric layers 11 are formed by firing ceramic raw material powder of which a main component is a ceramic material having a perovskite structure.

From a viewpoint of downsizing the multilayer ceramic capacitor 100 and enlarging capacity of the multilayer ceramic capacitor 100, it is requested that thicknesses of the dielectric layers are reduced. However, when the thicknesses of the dielectric layers 11 are reduced, life characteristic of the multilayer ceramic capacitor 100 may be degraded and reliability of the multilayer ceramic capacitor may be degraded.

Next, a description will be given of degradation of the reliability. The dielectric layer 11 is formed by firing ceramic raw material powder of which a main phase has a perovskite structure expressed by a general formula $ABO_3$ and sintering the ceramic raw material powder. Therefore, when the ceramic raw material powder is exposed to reductive atmosphere during the firing, oxygen defect occurs in $ABO_3$ of the ceramic raw material powder. During operation of the multilayer ceramic capacitor 100, a voltage is repeatedly applied to the dielectric layer 11. In this case, the oxygen defect moves, and barrier may be broken. That is, the oxygen defect in the perovskite structure is one of reasons of the reliability degradation of the dielectric layer 11.

And so, it is preferable that an element acting as a donor is included (solid-solved) in a B site of the perovskite structure. For example, the element acting as a donor is such as Mo (molybdenum), Nb (niobium), Ta (tantalum), W (tungsten) or the like. When the element acting as a donor is solid-solved in the B site, the oxygen defect in the perovskite structure is suppressed. Therefore, life of the dielectric layer 11 is elongated, and the reliability of the dielectric layer 11 is improved.

However, when the element acting as a donor is solid-solved in the B site, defect such as degradation of insulation characteristic may occur. And so, it is preferable that the element acting as a donor is solid solved in the B site and an element acting as an acceptor is also solid-solved in the B site. For example, the element acting as an acceptor is such as Mn (manganese), Ni, Cu, Fe (iron), Cr (chromium), Co (cobalt), Zn (zinc), Y (yttrium), Dy (dysprosium), Ho (holmium), Er (erbium) or the like. When the element acting as an acceptor is solid-solved in the B site, a leak current is suppressed. Therefore, degradation of the insulation characteristic of the dielectric layer 11 is suppressed.

However, in this case, although the degradation of the insulation characteristic is suppressed, donor effect is degraded. And so, in the embodiment, a description will be given of a manufacturing method of the multilayer ceramic capacitor 100, by using ceramic raw material powder which is capable of maintaining the donor effect and the acceptor effect.

In the embodiment, in B sites of ceramic raw material powder having the perovskite structure, the element acting as a donor and the element acting as an acceptor are solid-solved. And, concentration gradients of the element acting as a donor and the element acting as an acceptor are controlled.

In the embodiment, a relationship in a circumference region of the ceramic raw material powder and a relationship in a center region of the ceramic raw material powder are regulated, with respect to the concentration of the element acting as a donor and the concentration of the element acting as an acceptor. In concrete, the concentration of the element acting as a donor is larger than the concentration of the element acting as an acceptor, in the circumference region. And, the concentration of the element acting as an acceptor is larger than the concentration of the element acting as a donor, in the center region.

In addition to the concentration of the elements solid-solved in the B site, a relationship between a valence (+4) of the B site of the perovskite structure of parent crystal and a valence of the element solid-solved in the B site influences on the donor effect and the acceptor effect. For example, with respect to the element acting as a donor, the donor effect of an element of which a valence is +6 (for example, Mo) is larger than that of an element of which a valence is +5 (for example, V (vanadium)), when the concentration of the element of which the valence is +6 is the same as that of the element of which the valence is +5. In the same manner, with respect to the element acting as an acceptor, the acceptor effect of an element of which a valence is +2 (for example, Mn) is larger than that of an element of which a valence is +3 (for example, Fe), when the concentration of the element of which the valence is +2 is the same as that of the element of which the valence is +3. Therefore, it is preferable that a relative valence with respect to the valence of the B site (+4) is considered, from a viewpoint of achieving that the concentration of the element acting as a donor is larger than that of the element acting as an acceptor in the circumference region of the ceramic raw material powder and the concentration of the element acting as an acceptor is larger than that of the element acting as a donor in the center region.

And so, in the embodiment, an amount of the element acting as a donor which is solid-solved in the B site and an amount of the element acting as an acceptor which is solid-solved in the B site are regulated so that the following formula (1) and the following formula (2) are satisfied, with respect to the ceramic raw material powder.

In the center region: (concentration of the element acting as a donor)×(valence of the element acting as a donor−4)<(concentration of the element acting as an acceptor)×(4−the valence of the element acting as an acceptor)     (1)

In the circumference region: (concentration of the element acting as a donor)×(valence of the element acting as a donor−4)>(concentration of the element acting as an acceptor)×(4−valence of the element acting as an acceptor)     (2)

It is possible to, in the ceramic raw material powder, sufficiently enlarge the donor effect of the circumference region on which reduction/oxidation caused by the firing atmosphere/thermal treatment atmosphere has a large influence and to reduce the amount of the oxygen defect, when the multilayer ceramic capacitor is manufactured by using the ceramic raw material powder satisfying the relationships. And it is possible to sufficiently enlarge the acceptor effect in the center region of the ceramic raw material powder. And the insulation characteristic is improved. It is therefore possible to achieve both of the donor effect and the acceptor effect. Accordingly, it is possible to manufacture the multilayer ceramic capacitor in which a balance between life and insulation characteristic is good and reliability is excellent.

Figure 2A:
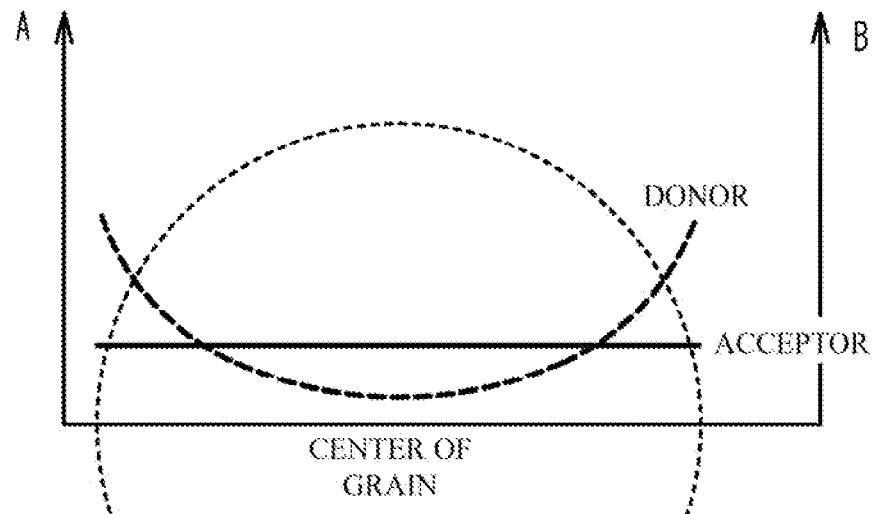
FIG. 2A and FIG. 2B illustrate concentration gradients of an element acting as a donor and an element acting as an acceptor.

A value A is (concentration of the element acting as a donor)×(valence of the element acting as a donor−4). A value B is (concentration of the element acting as an acceptor)×(4−valence of the element acting as an acceptor). For example, as illustrated in FIG. 2A, in the B site of the perovskite structure, the ceramic raw material powder has a gradient in which the value A gradually or stepwise decreases from the circumference region to the center region and the value B has an even distribution without a concentration gradient. For example, the concentration of the element acting as a donor in the circumference region is larger than the concentration of the element acting as a donor in the center region. In FIG. 2A, a dotted line schematically indicates a grain of the ceramic raw material powder. A horizontal axis indicates a position of the grain. A first vertical axis (left axis) indicates the value A. A second vertical axis (right axis) indicates the value B.

Figure 2B:
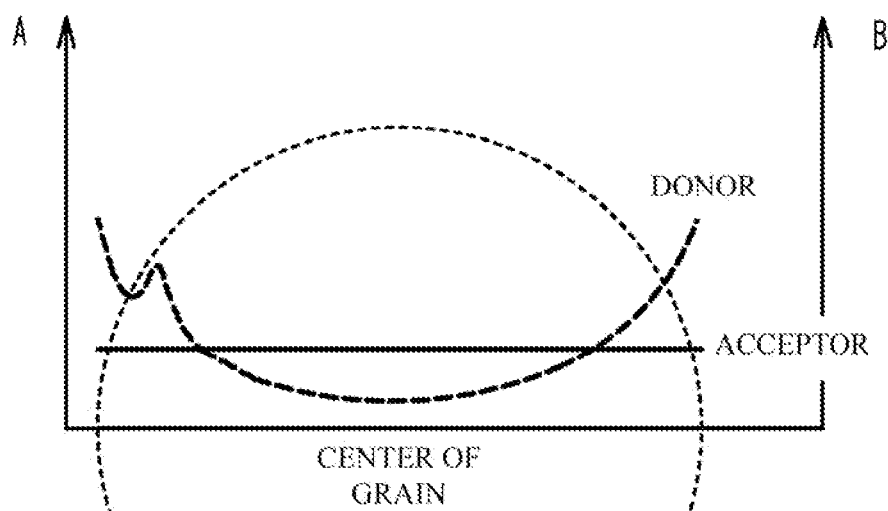

The ceramic raw material powder has the relationships of the formula (1) and the formula (2), in the center region and the circumference region. Therefore, as illustrated in FIG. 2B, the decreasing gradient of the value A may have a local maximum value, on the way from the circumference region to the center region.

The relationships of the formula (1) and the formula (2) may be applied to a case where two different elements acting as a donor are added to the B sites. And, the relationships of the formula (1) and the formula (2) may be applied to a case where two different elements acting as an acceptor are added to the B sites. In these cases, a weight average of the two different elements may be used as the concentration of the elements acting as a donor or the concentration of the elements acting as an acceptor.

The center region of grains may be defined as a geometric gravity center region.

A description will be given of a reason that the element acting as a donor and the element acting as an acceptor are solid-solved in the ceramic raw material powder. For example, it is thought that the relationships of the formula (1) and the formula (2) are achieved, by mixing the ceramic raw material powder, the oxide of the element acting as a donor and the oxide of the element acting as an acceptor, and diffusing each element in a firing process. However, even if the concentration of the element acting as a donor in the circumference region of each grain can be enlarged, it is difficult to diffuse each element into the center region of each grain. Therefore, the element acting as a donor and the element acting as an acceptor are solid-solved in the ceramic raw material powder.

Figure 3:
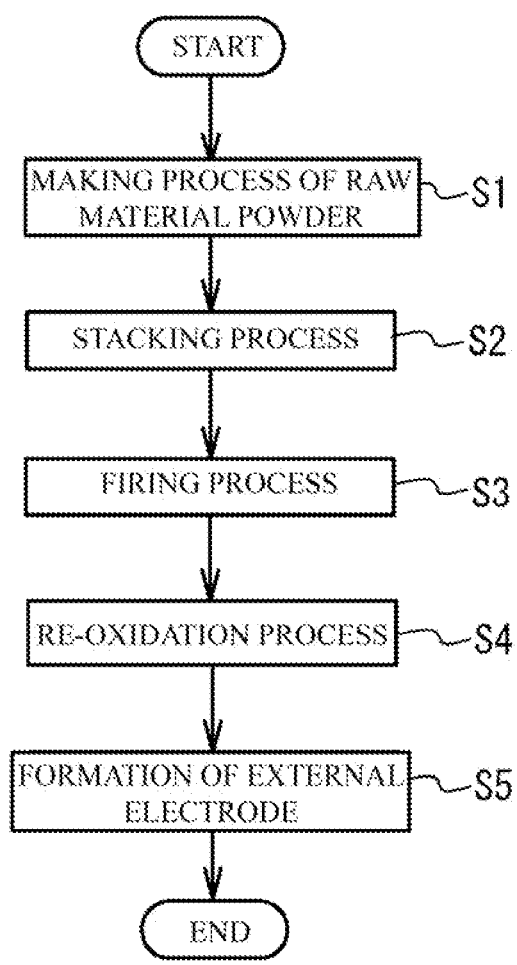
FIG. 3 illustrates a manufacturing method of a multilayer ceramic capacitor.

Next, a description will be given of a manufacturing method of the multilayer ceramic capacitor 100. FIG. 3 illustrates a manufacturing method of the multilayer ceramic capacitor 100.

(Making process of raw material powder) Ceramic raw material powder, in which the main phase has a perovskite structure expressed by a general formula $ABO_3$ and the element acting as a donor and the element acting as an acceptor are solid-solved in B sites so that the formula (1) and the formula (2) are satisfied, is prepared. Various methods can be used as a synthesizing method of the ceramic raw material powder. For example, a solid-phase method, a sol-gel method, a hydrothermal method or the like can be used. For example, in a case where Mo and Mn are solid-solved in the Ti site of $BaTiO_3$, $BaTiO_3$ in which Mn is solid-solved is made from mixed powder of $BaCO_3$, $TiO_2$ and $MnCO_3$. After that, Mo compound is added to the $BaTiO_3$ in which Mn is solid-solved. And grain growth of the $BaTiO_3$ is performed. For example, it is preferable that an average grain diameter of the ceramic raw material powder is 50 nm to 150 nm, from a view point of thickness reduction of the dielectric layers 11.

Additive compound may be added to the resulting ceramic raw material powder in accordance with purposes. The additive compound may be an oxide of a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B (boron), Na (sodium), K (potassium) and Si (silicon), or glass.

For example, the resulting ceramic raw material powder is wet-blended with additives and is dried and crushed. Thus, a ceramic material is obtained. For example, the grain diameter may be adjusted by crushing the resulting ceramic material as needed. Alternatively, the grain diameter of the resulting ceramic power may be adjusted by combining the crushing and classifying. With the processes, the ceramic material acting as a main component of the dielectric layers are obtained.

(Stacking process) Next, a binder such as polyvinyl butyral (PVB) resin, an organic solvent such as ethanol or toluene, and a plasticizer are added to the resulting dielectric material and wet-blended. With use of the resulting slurry, a stripe-shaped dielectric green sheet with a thickness of 3 μm to 10 μm is coated on a base material by, for example, a die coater method or a doctor blade method, and then dried.

Then, a pattern of the internal electrode layer 12 is provided on the surface of the dielectric green sheet by printing metal conductive paste for forming an internal electrode with use of screen printing or gravure printing. The conductive paste includes an organic binder. A plurality of patterns are alternatively exposed to the pair of external electrodes. The metal conductive paste includes ceramic particles as a co-material. A main component of the ceramic particles is not limited. However, it is preferable that the main component of the ceramic particles is the same as that of the dielectric layer 11. For example, $BaTiO_3$ having an average grain diameter of 50 nm or less may be evenly dispersed.

Then, the dielectric green sheet on which the internal electrode layer pattern is printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to a pair of the external electrodes 20a and 20b of different polarizations. A cover sheet to be the cover layer 13 is clamped to an upper face of the stacked dielectric green sheets, and another cover sheet to be the cover layer 13 is clamped to a lower face of the stacked dielectric green sheets. The resulting stacked structure is stamped into a predetermined size (for example, 1.0 mm×0.5 mm).

After that, the binder is removed from the ceramic multilayer structure in $N_2$ atmosphere. After that, metal conductive paste for the external electrodes 20a and 20b is coated from the both end faces to the side faces of the ceramic multilayer structure and is dried. The metal conductive paste includes a metal filer, a co-material, a binder, a solvent and so on. The metal conductive paste is to be ground layers of the external electrodes 20a and 20b.

(Firing process) The binder is removed in $N_2$ atmosphere in a temperature range of 250 degrees C. to 500 degrees C. After that, the resulting compact is fired for ten minutes to 2 hours in a reductive atmosphere having an oxygen partial pressure of $10^{-5}$ to $10^{-8}$ atm in a temperature range of 1100 degrees C. to 1300 degrees C. Thus, each compound is sintered. In this manner, the ceramic multilayer structure is obtained.

(Re-oxidizing process) After that, a re-oxidizing process may be performed in $N_2$ gas atmosphere in a temperature range of 600 degrees C. to 1000 degrees C. With the re-oxidation process, the concentration of the oxygen defect is reduced.

(Forming process of external electrodes) After that, with a plating process, a metal such as Cu, Ni, and Sn may be coated on ground layers of the external electrodes 20a and 20b. With the processes, the multilayer ceramic capacitor 100 is manufactured.

In the manufacturing method of the embodiment, the ceramic raw material powder satisfying the formula (1) and the formula (2) is used. It is possible to, in the ceramic raw material powder, sufficiently enlarge the donor effect of the circumference region on which reduction/oxidation caused by the firing atmosphere/thermal treatment atmosphere has a large influence and to reduce the amount of the oxygen defect, when the multilayer ceramic capacitor 100 is manufactured by using the ceramic raw material powder satisfying the relationships. And it is possible to sufficiently enlarge the acceptor effect in the center region of the ceramic raw material powder. And the insulation characteristic is improved. It is therefore possible to achieve both the donor effect and the acceptor effect. Accordingly, it is possible to manufacture the multilayer ceramic capacitor 100 in which a balance between life and insulation characteristic is good and reliability is excellent.

Although the embodiments of the present invention have been described in detail, it is to be understood that the various change, substitutions, and alterations could be made hereto without departing from the spirit and scope of the invention.

What is claimed is:

1. Ceramic raw material powder comprising:
    a main phase having a perovskite structure,
    wherein an element acting as a donor and an element acting as an acceptor are solid-solved in B sites of the perovskite structure,
    wherein a relationship of (concentration of the element acting as a donor)×(valence of the element acting as a donor−4)<(concentration of the element acting as an acceptor)×(4−valence of the element acting as an acceptor) is satisfied, in a center of each grain of the ceramic raw material powder,
    wherein a relationship of (concentration of the element acting as a donor)×(valence of the element acting as a donor−4)>(concentration of the element acting as an acceptor)×(4−valence of the element acting as an acceptor) is satisfied, in a circumference region of each grain of the ceramic raw material powder,
    wherein a value of (concentration of the element acting as a donor)×(valence of the element acting as a donor−4) in the relationship of (concentration of the element acting as a donor)×(valence of the element acting as a donor−4)>(concentration of the element acting as an acceptor)×(4−valence of the element acting as an acceptor) decreases from the circumference region to the center.

2. The ceramic raw material powder as claimed in claim 1, wherein the main phase of the perovskite structure is $BaTiO_3$.

3. The ceramic raw material powder as claimed in claim 1, wherein the element acting as a donor is Mo,
    wherein the element acting as an acceptor is Mn.

4. A manufacturing method of a multilayer ceramic capacitor comprising:
    forming green sheets including ceramic raw material powder of which a main phase has a perovskite structure;
    forming a multilayer structure by alternately stacking each of the green sheets and each of paste for internal electrode;
    firing the multilayer structure,
    wherein an element acting as a donor and an element acting as an acceptor are solid-solved in B sites of the perovskite structure,
    wherein a relationship of (concentration of the element acting as a donor)×(valence of the element acting as a donor−4)<(concentration of the element acting as an acceptor)×(4−valence of the element acting as an acceptor) is satisfied, in a geometric gravity center of each grain of the ceramic raw material powder,
    wherein a relationship of (concentration of the element acting as a donor)×(valence of the element acting as a donor−4)>(concentration of the element acting as an acceptor)×(4−valence of the element acting as an acceptor) is satisfied, in a circumference region of each grain of the ceramic raw material powder, wherein a value of (concentration of the element acting as a donor)×(valence of the element acting as a donor−4) in the relationship of (concentration of the element acting as a donor)×(valence of the element acting as a donor−4)>(concentration of the element acting as an acceptor)×(4−valence of the element acting as an acceptor) decreases from the circumference region to the center.

5. The method as claimed in claim 4, wherein the main phase of the perovskite structure is $BaTiO_3$.

6. The method as claimed in claim 4, wherein the element acting as a donor is Mo, wherein the element acting as an acceptor is Mn.

7. A multilayer ceramic capacitor comprising:

a plurality of dielectric layers; and a plurality of internal electrode layers, wherein each of the plurality of dielectric layers and each of the plurality of internal electrode layers are alternately stacked, wherein the plurality of dielectric layers are formed by firing the ceramic raw material powder as claimed in claim 1.

* * * * *